United States Patent

Pajonk et al.

[11] Patent Number: 5,246,276
[45] Date of Patent: Sep. 21, 1993

[54] ELECTRONICALLY CONTROLLED BRAKE EFFORT PROPORTIONING SYSTEM

[75] Inventors: Peter Pajonk; Wolf-Dieter Jonner, both of Beilstein, Fed. Rep. of Germany

[73] Assignee: Robert Bosch GmbH, Stuttgart, Fed. Rep. of Germany

[21] Appl. No.: 761,785
[22] PCT Filed: Dec. 6, 1989
[86] PCT No.: PCT/EP89/01495
 § 371 Date: Sep. 20, 1991
 § 102(e) Date: Sep. 20, 1991
[87] PCT Pub. No.: WO90/08682
 PCT Pub. Date: Aug. 9, 1990

[30] Foreign Application Priority Data
Jan. 24, 1989 [DE] Fed. Rep. of Germany ....... 3901923

[51] Int. Cl.$^5$ .............................. B60T 8/26; B60T 8/32
[52] U.S. Cl. .................................. 303/9.62; 303/113.5; 303/119.1; 303/DIG. 4
[58] Field of Search ................... 303/94, 97, 100, 103, 303/111, DIG. 3, DIG. 6, 113.1, 119.1, 84.2, 9.62, 113.5, DIG. 1, DIG. 2, 901; 364/426.02

[56] References Cited

U.S. PATENT DOCUMENTS 4,962,971 10/1990 Miyake ............................. 303/100

FOREIGN PATENT DOCUMENTS 3440541 5/1986 Fed. Rep. of Germany ... 303/119 R
0121160 6/1985 Japan ............................. 303/100
2118651 11/1983 United Kingdom .
2141499 12/1984 United Kingdom .

Primary Examiner—Robert J. Oberleitner
Assistant Examiner—Josie A. Ballard
Attorney, Agent, or Firm—Felfe & Lynch

[57] ABSTRACT

Brake force proportioning system for a vehicle includes a two-way valve in the line between a diagonally connected front and rear wheel. A controller opens the valve continuously in a first region of brake pressure so that the brake force proportioning follows a fixed proportioning characteristic. Outside this region the valve is opened in pulses so that the proportioning follows an ideal characteristic curve. If the controller fails, a pressure limiting valve takes the place of the two-way valve and effects a pressure distribution according to a characteristic parallel to the fixed slope characteristic.

8 Claims, 2 Drawing Sheets

ELECTRONICALLY CONTROLLED BRAKE EFFORT PROPORTIONING SYSTEM

PRIOR ART

FIG. 2 of DE-A1 34 40 541 discloses an electronically controlled brake force distributor for a diagonal wheel pair in which a 2/2-way valve is inserted in the line leading to the brake of the rear wheel, blocking this line in the de-energised condition. The brake pressure at the rear wheel is regulated, using the slip values determined for the two wheels, by activation of the 2/2-way valve with pulses in such a way that the rear-wheel slip is below that of the front wheel.

Connected in parallel with the 2/2-way valve is a valve unit which permits brake pressure to be fed in at the rear wheel even when the 2/2-way valve is not being activated. However, the pressure which can be fed in by this means is limited.

EP-A1-028332 has also already disclosed an anti-lock brake system in which the pressure at the brakes of diagonally arranged wheels is controlled in common.

SUMMARY OF THE INVENTION

The design and activation, in accordance with the invention, of the valve brings a further improvement in function in conjunction with very favourable configuration in terms of cost. Setter utilisation of the adhesion of the rear axle is achieved in the two-channel ABS employed.

DETAILED DESCRIPTION OF THE PREFERRED EMBODIMENT

Figure 1:
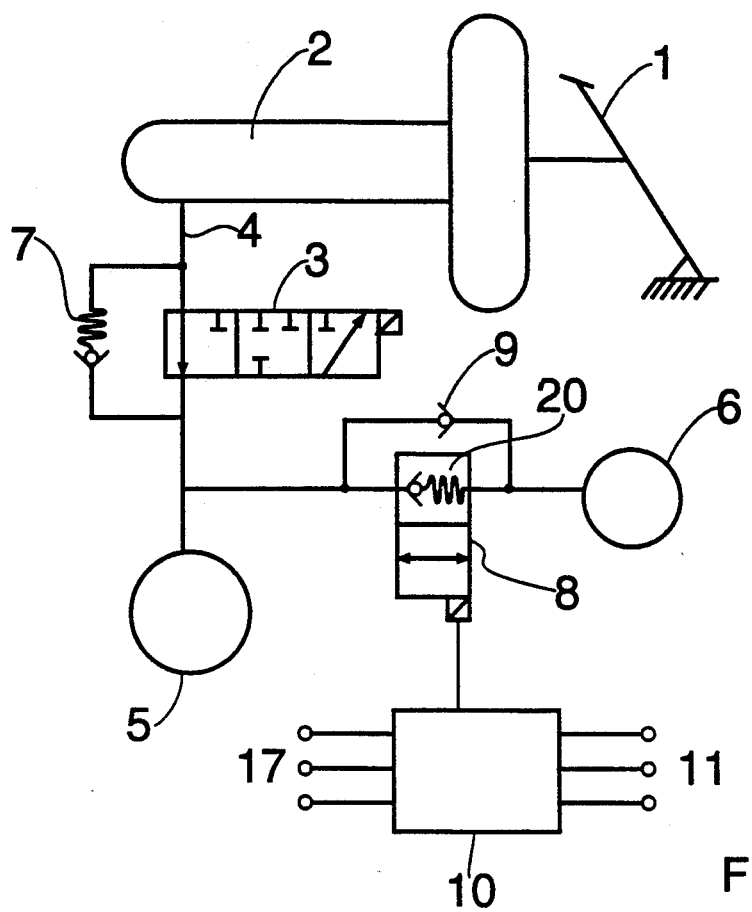
FIG. 1 shows a first illustrative embodiment

In FIG. 1, 1 denotes a brake pedal and 2 denotes a master brake cylinder arrangement for two brake circuits. Only the brake circuit for one wheel diagonal is illustrated. The other brake circuit is of analogous construction. Inserted into the brake line 4 is an ABS brake pressure control valve 3 for the common variation of the brake pressure at a front wheel 5 and a rear wheel 6. This valve 3 is bridged by a nonreturn valve 7.

To approximate the brake force distribution to the ideal brake force distribution, a 2/2-way valve 8 is inserted into the brake line leading to the rear-wheel brake, which valve, in the unactivated condition, brings into effect a pressure-limiting valve. This valve can also be situated in parallel with the 2/2-way valve. It opens when the prevailing pressure difference reaches a certain value.

In order to permit a pressure reduction, a non-return valve 9 is connected in parallel with the 2/2-way valve. The 2/2-way valve 8 is activated by control device 10, to which signals corresponding to the wheel speeds and, in the case of brake actuation, a further signal are fed via terminals 11.

With the aid of the brake-actuating signal, the control device 10 ensures that, upon actuation of the brake, the valve 8 is activated and remains activated until a brake force of about 0.5 g is achieved. The reaching of this point A (FIG. 2) can be detected via the determination of the wheel slips. It is also possible for the actuation of the 2/2-valve 8 to be effected by the switching on of the ignition, the actuation of the starter or the actuation of a switch which is switched on in the brake circuit. These alternative inputs to control device 10 are represented by terminals 17.

Figure 2:
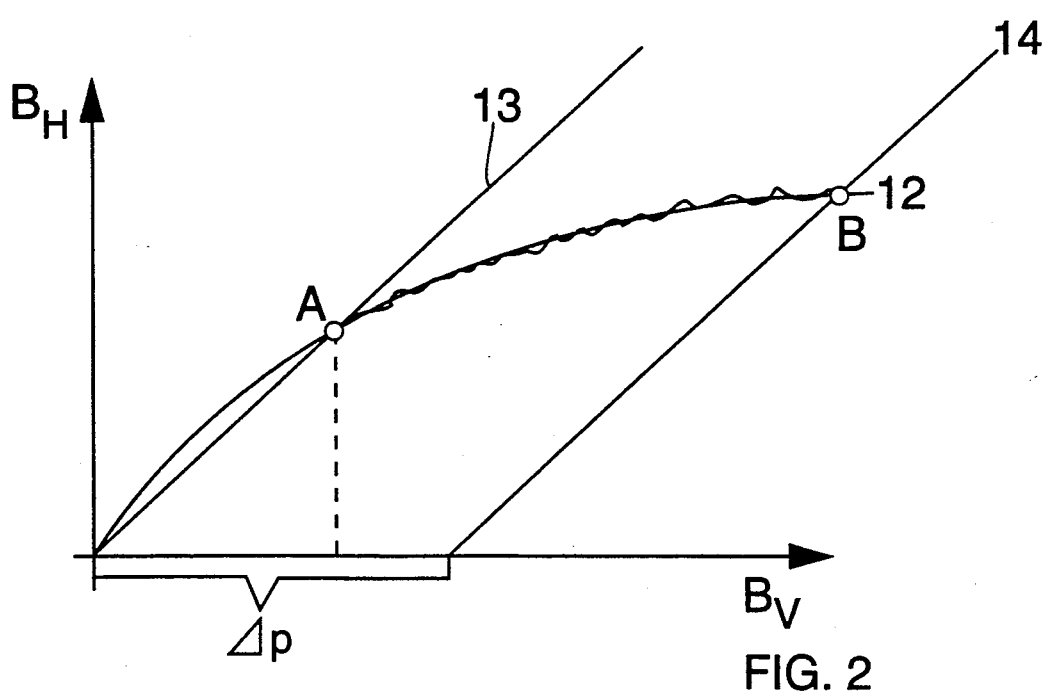
FIG. 2 shows a diagram for the purpose of illustration and
FIG. 3 shows a further illustrative embodiment.

In FIG. 2, $B_V$ is the brake force on the front wheel and $B_H$ is the brake force on the rear wheel. The ideal brake-force distributor characteristic is denoted by 12, and the fixed proportioning characteristic allocated to the vehicle but steeper than that of the prior art is denoted by 13. In the activation of the valve in accordance with the invention, the brake force distribution follows the fixed proportioning characteristic 13 between 0 and the point A. After this, the proportioning is varied along the characteristic 12 by activation of the 2/2-way valve with pulses which vary in width or in frequency.

The pressure-limiting valve 20 which is operative in the de-energised position of the 2/2-way valve 8, that is if the control device fails, opens when the pressure difference is $\Delta p$. It produces an offset characteristic 14 which runs parallel to the characteristic 13 with an offset of $\Delta p$. $\Delta p$ is chosen so that the ideal distributor characteristic 12 is intersected at point B at a brake force of about 0.85 g.

Account must furthermore be taken of the fact that the brake force distribution is effected in such a way that the lock-up pressure level of the front wheel is never greater than the lock-up pressure level of the rear axle by more than the opening pressure of the pressure-limiting valve since the 2/2-way valve 8 does not have a complete blocking effect.

Where a 2-channel ABS is fitted, the design according to the invention improves its performance.

Figure 3:
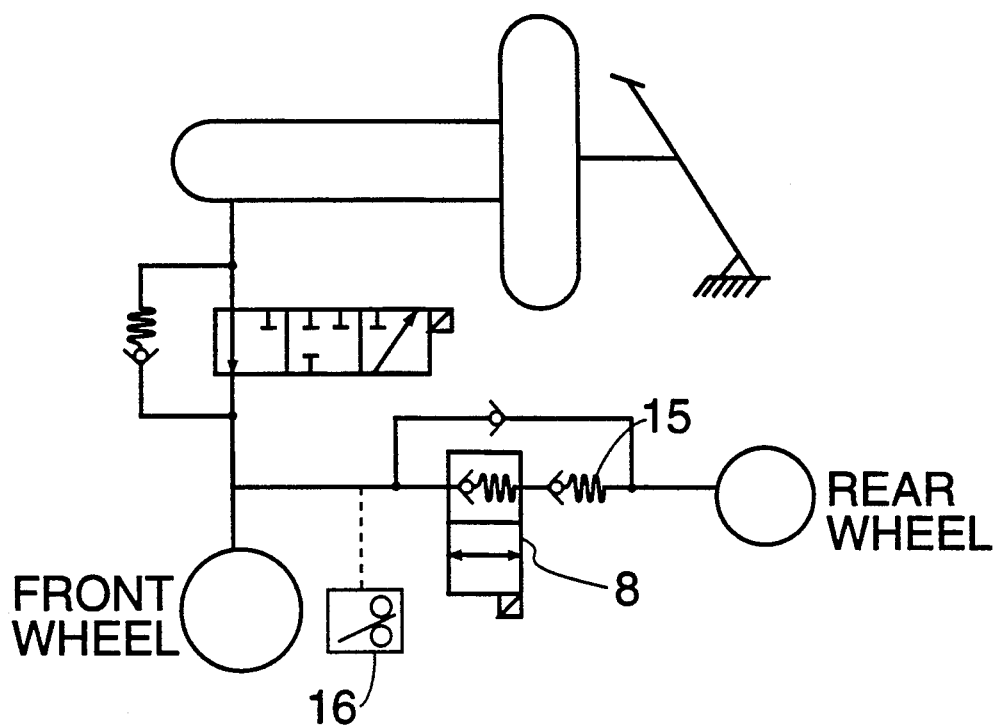

The illustrative embodiment of FIG. 3 differs from that of FIG. 1 in that a pressure sensor 16 is inserted upstream of the 2/2-way valve 8, emitting a signal upon attainment of a certain small pressure value, and in that a further pressure-limiting valve 15 is inserted at the outlet of the 2/2-way valve 8. The pressure sensor can be a pressure switch, a limit switch or a flow switch. When it responds, the valve 8 is switched.

In order to reduce brake-force losses, the fixed brake-force distributor characteristic is selected by means of the choice of brake calliper in such a way that only small portions of the ideal characteristic lie above the fixed distributor characteristic 13, which has a slope of about 45° (see FIG. 2). However, it is then advantageous, even with valve 8 actuated, still to have an operative pressure-reducing valve 15, which in effect brings about a parallel displacement of the fixed distributor characteristic 13 similarly to line 14 (FIG. 2). This brings about an improvement in the stability of the vehicle at low $\mu$. The use of the switch 16 has the effect that the solenoid valve 8 is only activated in braking phases. In addition, it is not necessary to monitor the rear axle so intensively.

We claim:

1. Brake force distribution system for a vehicle having a starter, an ignition, a brake pedal, a brake at each of two front wheels, and a brake at each of two rear wheels, said system comprising master cylinder means connected to provide brake pressure to the brake of each front wheel in order to generate a brake force at each front wheel, a brake line connecting the brake of each front wheel to the brake of a diagonally opposed rear wheel, said brake line transmitting brake pressure to said rear wheel in order to generate a brake force at said rear wheel, a solenoid valve in each said brake line, said solenoid valve having an active position and a rest position, electronic control means effective to activate said solenoid valve continuously up to a predetermined brake force so that the brake force at the rear wheel is related to the brake force at the front wheel by a fixed straight-line characteristic, and being effective to activate said solenoid valve in pulses when said predetermined brake force is exceeded so that the brake force at the rear wheel is related to the brake force at the front wheel by an ideal brake force distribution characteristic, and a first pressure limiting valve in each said brake line being effective when said solenoid valve is in said rest position, said pressure limiting valve being closed until a predetermined pressure difference between the front and rear wheel is reached, said pressure limiting valve being opened when said predetermined pressure difference is exceeded so that the brake force at the rear wheel is related to the brake force at the front wheel by an offset characteristic having the same slope as the fixed straight line characteristic.

2. System as in claim 1 wherein said electronic control means activates said solenoid valve in pulses so that said offset characteristic meets said ideal characteristic at a brake force on the rear wheel which is higher than said predetermined brake force.

3. System as in claim 1 wherein said control means activates said solenoid valve continuously in response to a signal indicating actuation of said brake pedal.

4. System as in claim 1 wherein said control means activates said solenoid valve continuously in response to a signal indicating switching on of the ignition.

5. System as in claim 1 wherein said control means activates said solenoid valve continuously in response to a signal indicating actuation of the starter.

6. System as in claim 1 further comprising a pressure sensor for sensing pressure in the brake line upstream of the solenoid valve, said pressure sensor producing a signal when a predetermined pressure is sensed, said control means activating said solenoid valve continuously in response to said signal from said pressure sensor.

7. System as in claim 1 further comprising a second pressure limiting valve in the brake line between the solenoid valve and the rear brake, said second pressure limiting valve being effective when the solenoid valve is in the active position and the rest position.

8. System as in claim 1 wherein said fixed straight line characteristic has a slope of about 45°.

* * * * *